Feb. 26, 1946. H. OSTERBERG ET AL 2,395,561
PROJECTION APPARATUS
Filed Oct. 5, 1942
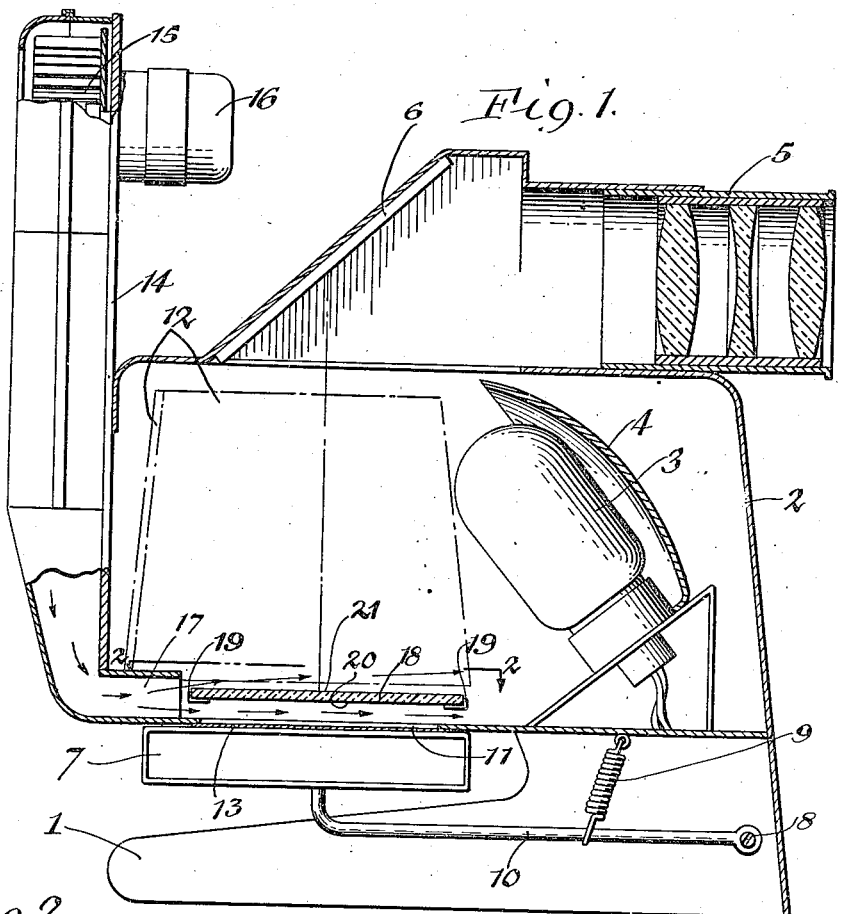
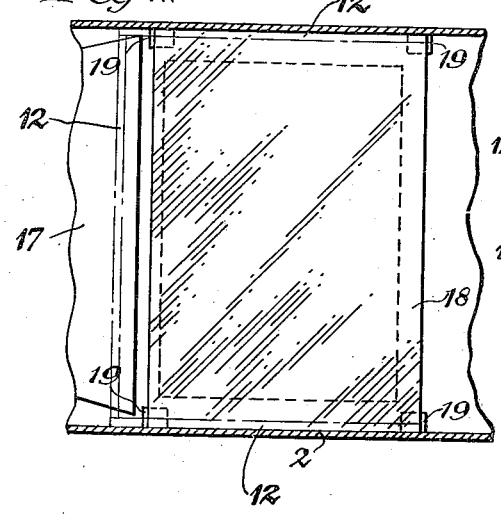
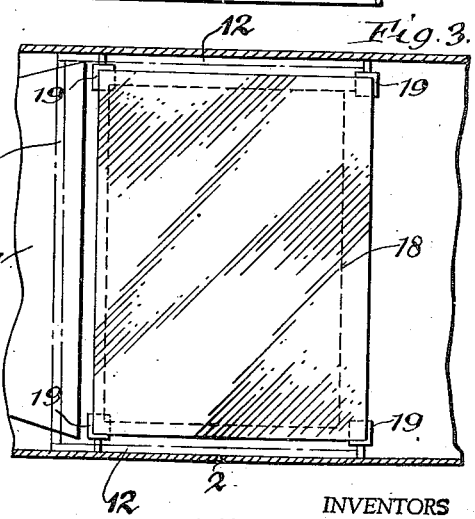
INVENTORS
HAROLD OSTERBERG
PAUL C. HELYN
BY
ATTORNEY Patented Feb. 26, 1946

2,395,561

UNITED STATES PATENT OFFICE 2,395,561

PROJECTION APPARATUS

Harold Osterberg and Paul C. Heijn, Buffalo, N. Y., assignors, by mesne assignments, to American Optical Company, Southbridge, Mass., a voluntary association Application October 5, 1942, Serial No. 460,906

3 Claims. (Cl. 88—24)

This invention relates to projection apparatus and has particular reference to new and improved means for preventing injury to the object projected by said apparatus.

An object of the invention is to provide a new and improved means for preventing injury to the objects projected from the heat from the illuminating system of said projection apparatus.

Another object of the invention is to provide means for cooling or ventilating the object being projected by an opaque projector which will prevent said object from being injured or damaged from heat from the illuminating system of the projector.

Another object of the invention is to provide means for protecting the object to be projected against radiating heat and/or ultraviolet light from the illuminating system of the projector.

Another object of the invention is to provide means for preventing heat from the illuminating system of the projection apparatus from reaching the object to be projected and means for cooling said heat preventing means to prevent injury thereto from said heat.

Another object of the invention is to provide new and improved means for directing the cooling air current towards the object being projected to prevent injury thereof by heat.

Another object of the invention is to provide new and improved means for preventing the heat from the illuminating system of a projector reaching and injuring the object being projected by a projector for projecting opaque materials or the like.

Other objects and advantages of the invention will be apparent from the following description taken in connection with the accompanying drawing and it will be apparent that many changes may be made in the arrangement of parts and details of construction without departing from the spirit of the invention as set forth in the accompanying claims. We, therefore, do not wish to be limited to the exact details of construction and arrangement of parts shown and described as the preferred form has been shown by way of illustration only.

Referring to the drawing:

Fig. 1 is a side view partially in section of a projection apparatus embodying the invention.

Fig. 2 is a fragmentary sectional view taken on line 2—2 of Fig. 1 looking in the direction of the arrows.

Fig. 3 is a view similar to Fig. 2 but showing a modified form of the invention.

With projection apparatus and particularly that type of projection apparatus adapted for the projection of opaque objects or the like, such as postcards, pages of books, biological materials, etc., it has been necessary that a high power illuminating system be employed in order to obtain the desired illumination on the object to obtain a successful image upon the screen. This use of a high power illuminating system has introduced difficulties in that the heat radiated from said system sometimes caused injury to the material being projected, and especially where such material was sensitive, such as printed postcards, dyed fabrics and biological materials, and even though cooling systems have been provided whereby an air stream has been forced into the interior of the projector yet damage has been done to such sensitive materials because of the amount of infra-red and ultraviolet rays emanating from said intense light source. It is therefore one of the prime objects of this invention to provide new and improved means for preventing injury to said materials which will allow the longer projection of said materials and the projection of materials which are sensitive to both infra-red and ultraviolet rays.

Referring more particularly to the drawing wherein similar reference characters designate corresponding parts throughout the several views:

The projection apparatus embodying the invention comprises a base 1 on which is supported the housing or casing 2 containing the lamp 3 and reflector 4 and supporting the projection lens system 5 and reflector 6.

Pivotally mounted on the base 1 is the platen 7 which is pivoted to said base 1 at 8 and which is normally urged toward the under side of said casing 2 by the resilient or coil spring 9 which is secured at one end to the base 2 and at its opposite side to the arm or support 10 for said platen. Said platen 7 is adapted to overlie the opening 11 in the bottom wall of said casing to support objects to be projected in alignment with said opening 11 whereby the said objects may be projected by the reflector 6 through the optical system 5 onto a projection screen.

The reflector 4 assisted by the reflectors 12 is adapted to concentrate the light from the lamp 3 upon the object 13 on the platen 7 to project an image on the projection screen of the object 13.

Secured to the casing 2 is the cooling or ventilating member 14 which comprises the fan 15 adapted to be driven by the motor 16 and this causes an air stream to flow through the channel or canal formed by the member 14 and to enter said housing 2 through an opening 17 adjacent the lower rear portion thereof to ventilate the interior of said housing.

Over the opening 11 in the lower wall of the casing 2 and in alignment with the platen 7 and material to be projected 13 is placed the rear retarding or absorbing screen or the like 18. This heat absorbing or retarding screen may be supported by projections 19 secured to the walls of said housing 2 and may extend from wall to wall as shown in Fig. 2 or may be spaced from the said walls adjacent its ends as shown in Fig. 3.

The said heat screen 18 is preferably formed of a glass having infra-red or heat absorbing or retarding properties and if desired also ultraviolet ray absorbing or retarding properties which will prevent ultraviolet and/or infra-red rays from reaching the material to be projected. Such screen 18 may be formed with a commercial glass known as Calobar or the commercial glass known as Aklo or other similar glasses having the properties mentioned above.

The said screen 18 is preferably positioned as shown in Fig. 1 so that the air stream entering said housing through the opening 17 will have a portion thereof directed toward the lower surface 20 of said screen 18 and the opening 11 in the lower wall of the casing which will both cool the lower surface 20 of the said screen 18 and the material to be projected 13 and a portion of said air stream will be directed over the upper surface 21 of said screen 18 so that said screen 18 will be cooled on both sides to prevent breakage thereof and also the air stream directed between the lower side 19 of said screen 18 and the material to be projected 13 will cool said material 13 and prevent injury thereto by heat from said lamp 3.

It is also pointed out that as the said screen 18 may be cooled on both sides thereof that instead of using a screen of a heat absorbing or infra-red and/or ultraviolet glass as described above the said screen 18 may be formed of plate glass.

This plate or screen 18 should be as transparent as possible in order not to interfere with the transmission of light therethrough any more than necessary.

There are also a number of glasses on the market which retard or absorb the infra-red and/or ultraviolet rays but are transparent and which are clear or transparent and such glasses may be used for said screen or plate 18.

From the foregoing it will be seen that we have provided simple, efficient and economical means for obtaining all of the objects and advantages of the invention.

Having described our invention we claim:

1. An opaque projector comprising the combination with a projection lens system a reflector optically aligned therewith and a source of illumination, of a horizontal conduit for cooling air defined by an upper transparent wall and a lower pivoted platen for supporting the material to be projected, and a blower for delivering cooling air to one end of said conduit, the portion of said conduit including the upper transparent wall and the pivoted platen being optically aligned with said reflector and projection lens system for the projection of an image of the material supported by said platen.

2. An opaque projector as set forth in claim 1 in which the horizontal conduit for cooling air has a bleed opening adjacent the transparent wall for the passage of cooling air over the upper as well as the lower surface of said transparent wall.

3. An opaque projector as set forth in claim 1 in which the transparent wall for the cooling air conduit is a filter for selectively absorbing invisible radiation from the source of illumination.

HAROLD OSTERBERG.
PAUL C. HEIJN.